(12) United States Patent
Nagel

(10) Patent No.: US 7,089,162 B2
(45) Date of Patent: Aug. 8, 2006

(54) NAVIGATION MAP CREATION SYSTEM

(75) Inventor: Philipp Harald Nagel, Seevetal (DE)

(73) Assignee: Harman International Industries, Incorporated, Northridge, CA (US)

( * ) Notice: Subject to any disclaimer, the term of this patent is extended or adjusted under 35 U.S.C. 154(b) by 737 days.

(21) Appl. No.: 10/142,279

(22) Filed: May 8, 2002

(65) Prior Publication Data

US 2003/0101036 A1 May 29, 2003

Related U.S. Application Data

(63) Continuation-in-part of application No. 10/037,303, filed on Nov. 7, 2001.

(51) Int. Cl.
*G06F 17/10* (2006.01)
(52) U.S. Cl. .......................... 703/2; 701/208
(58) Field of Classification Search .................. 703/2, 703/1; 701/207, 208, 209, 211, 213; 353/5, 353/11; 340/990
See application file for complete search history.

(56) References Cited

U.S. PATENT DOCUMENTS

| | | | | |
|---|---|---|---|---|
| 3,783,294 A | * | 1/1974 | Koper | 250/558 |
| 5,109,340 A | * | 4/1992 | Kanayama | 701/25 |
| 5,566,288 A | | 10/1996 | Koerhsen | |
| 5,724,072 A | * | 3/1998 | Freeman et al. | 345/648 |
| 6,047,234 A | | 4/2000 | Cherveny et al. | |
| 6,314,341 B1 | * | 11/2001 | Kanayama | 701/1 |
| 6,366,851 B1 | * | 4/2002 | Chojnacki et al. | 701/208 |
| 6,366,927 B1 | | 4/2002 | Meek et al. | |
| 6,438,494 B1 | | 8/2002 | Yamamoto et al. | |

FOREIGN PATENT DOCUMENTS

| | | |
|---|---|---|
| DE | 41 24 654 A1 | 1/1993 |
| DE | 199 49 698 A1 | 4/2001 |
| EP | 394 517 A1 | 10/1990 |
| EP | 0 789 225 A1 | 8/1997 |
| EP | 1 045 224 | 10/2000 |
| EP | 1 205 731 A1 | 5/2002 |

OTHER PUBLICATIONS

Bronstein et al., "Taschenbuch Der Mathermatik", 1973, pp. 94-95, 276-277.

* cited by examiner

*Primary Examiner*—Albert W. Paladini
(74) *Attorney, Agent, or Firm*—Brinks Hofer Gilson & Lione

(57) ABSTRACT

A system is provided that simulates cartographic features of an electronic map. The system employs one or more geometric shapes, such as a clothoid, to represent cartographic features of the electronic map. The system may more accurately and realistically describe the cartographic features of the map than a straight line system. The system may include a data model and methodology for converting data from a straight line system to a clothoid system. The system may also reduce the amount of memory capacity needed to describe the cartographic features of the electronic map. The electronic map may be displayed on a computer network, such as a wide area network, a local area network, a wireless or wireline network, Intranets or the Internet. This system may also be used with other systems, such as navigation systems.

25 Claims, 11 Drawing Sheets

NAVIGATION MAP CREATION SYSTEM

RELATED APPLICATIONS

This application claims priority as a continuation-in-part application to U.S. application Ser. No. 10/037,303, filed Nov. 7, 2001 entitled "Apparatus and Method for Creating a Navigation Map."

BACKGROUND OF THE INVENTION

1. Technical Field

The invention relates to mapping cartographic features, and in particular to electronic maps that may be used with navigation systems or displayed on a computer network.

2. Related Art

The use of guidance navigation systems, such as those that use electronic maps to help guide users to their destination is becoming increasingly prevalent. Such guidance navigation systems typically use a medium such as a compact disc (CD) or digital video disc (DVD) to store data relating to the cartographic features of the map, such as streets, buildings, parks and rivers. The coupling of Global Positioning Systems (GPS) data with navigation systems has made use of navigation systems practical for a number of applications. GPS-based navigation systems may be found in a variety of vehicles, as well as in user portable devices.

Known navigation systems typically use electronic maps to represent cartographic features by saving and recalling a series of points connected by straight lines. This type representation, however, includes a number of disadvantages. For example, in reality, roads and rivers are not composed of a series of straight lines, but instead are composed of a series of smooth curves. As a result, a navigation map displaying graphical information to the user on a display unit does not typically show features of map details to a high degree of accuracy. In an attempt to more accurately represent map details, the number of straight line segments used to represent the map details can be increased. However, increasing the number of line segments leads to a large increase in the amount of data that must be stored to accurately represent the features. Therefore, there is a need for mapping system for navigation systems that accurately models and displays information indicative of cartographic features without requiring large amounts of memory.

SUMMARY

A geometric shape, such a clothoid, may be used to describe cartographic features of a map in electronic form. The map may be used in connection with a decentralized navigation system or by a navigation system connected to a communication network. The system may include navigation map data that describes the cartographic features in terms of clothoids. The cartographic features such as roads, railroad lines, rivers and lakes, etc., may be represented by one or more clothoids.

Rather than representing the cartographic features by a sequence of straight lines, the cartographic features may be represented by a series of clothoids connected by points. The clothoids may be represented by a starting point, a starting curvature, an end point and an end curvature. Thus, the amount of memory required to store parameters of the navigation map may be reduced when compared to known systems that represent cartographic features with a series of straight lines. Also, the accuracy of the navigation map may be increased while minimizing the need to increase the memory storage requirements of the system.

The navigation system may receive sensor data from a plurality of sensors and generate a map to the user on a display of the navigation system. The navigation system may include map data indicative of roadways or other cartographic features stored in memory in the form of clothoids in a data model. The system may also include a navigation processing unit that receives the sensor data, such as data from a GPS system corresponding to a current position of the user. The system may request map data from memory that is associated with the sensor data to compute a map image from the map data. The map image may be displayed to the user to indicate a current position of the user on the map.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings.

DETAILED DESCRIPTION OF THE PREFERRED EMBODIMENTS

A geometric shape such as a clothoid (also known as cornu or Euler's spiral) may be used to represent cartographic features on an electronic map. The map may be used with navigation systems or other systems that use electronic maps, such as Personal Digital Assistants (PDAs) or home computers. Such maps may also be accessed via computer networks, such as wireless networks, wide area networks (WANS), local area networks (LANS), Intranets and the Internet. These navigation systems may be used in portable systems or on vehicles such as automobiles, trucks, farming equipment, mining equipment, golf carts and mobile robots. These navigation systems may also be used for plotting known waterways for ships, known flight paths for planes, or with the autopilot of an airplane or a spaceship. The term "cartographic features" or "map features" should be broadly construed to include any attributes that may be depicted in an electronic map, such as roads, railroad lines, parks, buildings, rivers, etc.

Figure 1:
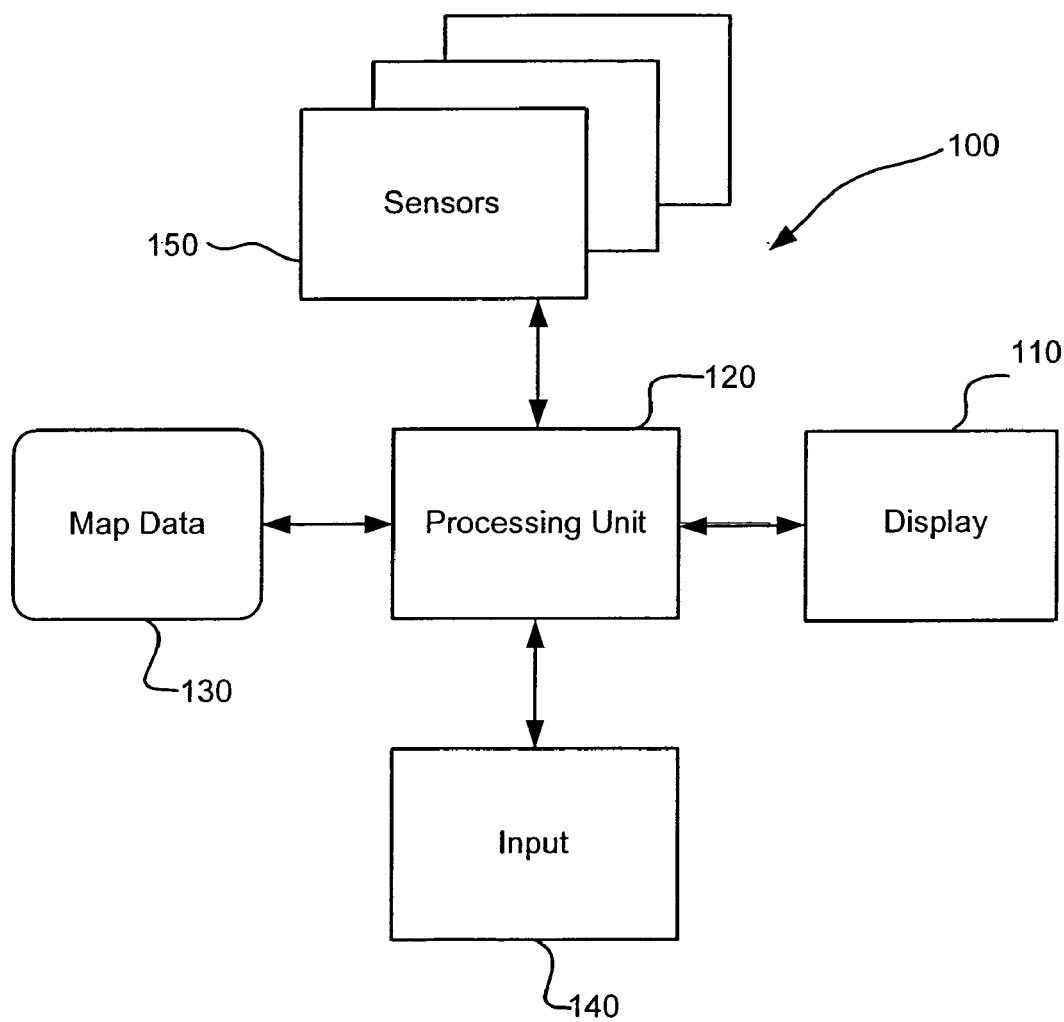
FIG. 1 is a block diagram illustrating a navigation system utilizing map data to produce maps on a display.

FIG. 1 is a block diagram illustrating a navigation system 100 utilizing map data to produce and generate maps. The navigation system 100 is used for explanation purposes only, and other systems may use different the navigation map systems. The navigation system 100 may include a display 110, a processor such as navigation processing unit 120, navigation map data 130, an input 140 and at least one sensor 150. The display 110 may be used to generate maps to the user. The display 110 may include a liquid crystal display (LCD), a cathode ray tube (CRT), a heads up display or any other types of display.

The display 100 may be connected with the navigation processing unit 120 that may access and process navigation map data 130 to display maps to the user. The user may request information and interface with the navigation system 100 via the input 140. The navigation system 100 may also include other features and devices such as communication links, global positioning satellites (GPS), base stations, or other transmitting systems.

The navigation map data 130 may include data regarding cartographic features that may be represented by one or more geometric shapes such as the clothoid. In addition, a series of clothoids may be used to represent the actual pattern of roads and other cartographic features more accurately and realistically than a representation with a sequence of straight lines. The use of clothoids allow for increased accuracy for displaying locations on the map. Precise positions may exist not only at the points where two straight lines join, but over the course of the road. Also, the representation of cartographic features by at least one clothoid requires fewer parameters than systems using sequential straight lines to represent map features thus saving storage memory storage space.

Sensors 150 may be used in conjunction with the navigation map data 130 to automatically maintain awareness of the trajectory and location (e.g., the route) of the user. The sensors 150 may include wheel counters to measure tire rotational speed, GPS devices to measure a location of the vehicle, gyros to measure when the vehicle is changing direction, flight data for airplanes, data regarding current direction and speed for boats, etc. The navigation processing unit 120 may also access information from the sensors and navigation map data 130 to calculate predictive route data that may describe a future predicted route. For example, the display may show some range of future travel based on current data. The navigation processing unit 120 may also utilize the sensors 150 and the navigation map data 130 to perform other route related functions, such as, estimated time of arrival, routing directions or any other dynamic parameters related to movement of the vehicle.

Figure 2:
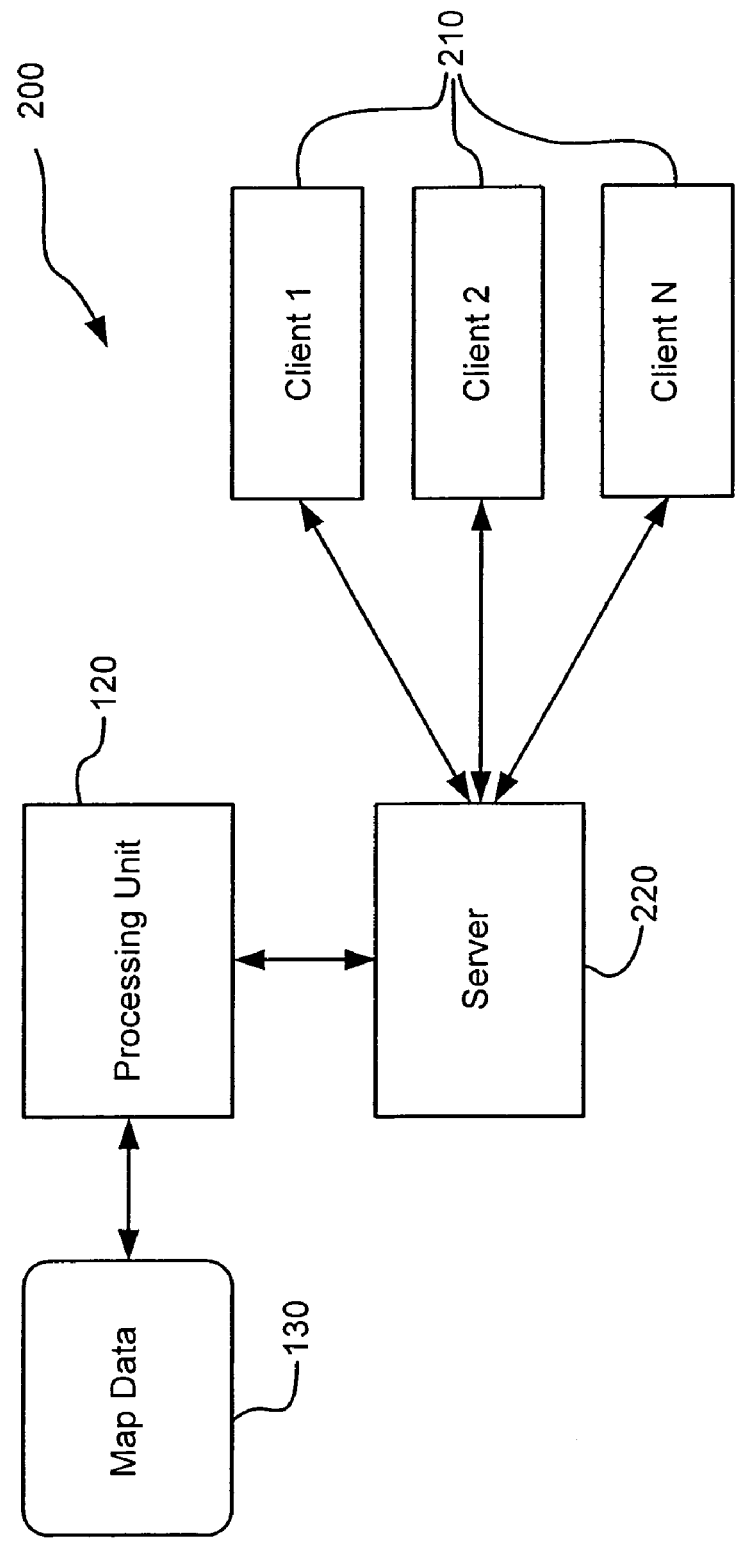
FIG. 2 is a block diagram illustrating a computer network system utilizing map data to produce maps on a display.

FIG. 2 is a block diagram illustrating a navigation system, connected to a computer network system 200. This system 200 may transmit and receive map data allowing the user to access maps from at least one client 210. The client 210 connects to a server 220 via a network. The server 220 may include a processor or computer that executes computer readable code. The network may include wireless and or wireline communications links, such as WANS, LANS, Intranets and/or the Internet. The server 220 may be connected to the navigation processing unit 120 via the network or any other communication path, to send and transmit data. Maps or map data may be transmitted to or received from the server 220 by the navigation processing unit 120. The navigation processing unit 120 may include memory and may communicate with a remote data storage unit 130 to store the navigation map data 130.

The computers and the navigation systems may include processor(s) executing instructions to perform the functions that are described. The instructions may be in the form processor readable code stored in memory accessible by the processor(s). The executable code may be implemented with hardware, software, firmware, or any combination thereof The processor(s) may bi-directionally communicate with one or more storage devices. The storage devices and the processor(s) may transmit and receive map related data, and other data related to operation of the computers and the navigation systems. The data may be transmitted with wireless and/or wireline communications and may include communication over computer networks.

Figure 3:
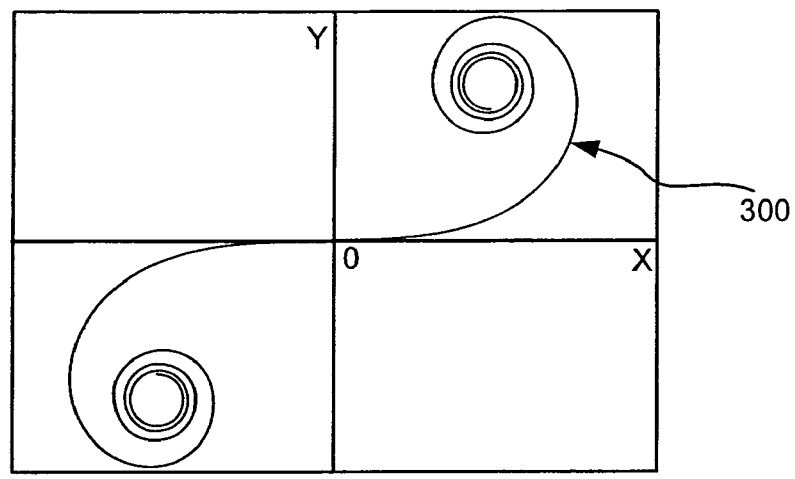
FIG. 3 is a graph illustrating a clothoid.

FIG. 3 is a graph illustrating a clothoid 300 that may be used to produce data regarding the cartographic features of a map. Clothoids are typically geometric shapes having linear changing curvatures. Accordingly, sections of the clothoid may be used to represent the cartographic features of the map, such as curved lines, straight lines, circles and splines. Straight lines and circles are special cases of a clothoid, and may be represented by different sections of the clothoid. This allows all cartographic features to be modeled with clothoids. To represent a straight line, a section of the clothoid having a curvature equal to zero may be used.

Figure 4:
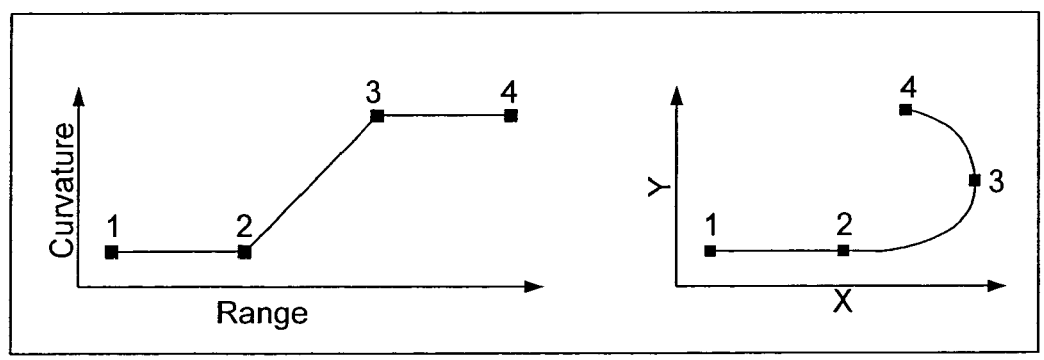
FIG. 4 are graphs illustrating the relationship of the curvature to the distance traveled.

FIG. 4 are graphs illustrating the relationship of the curvature to the distance traveled. Regarding the curvature-range graph, as the user travels from point 1 to point 2, the curvature remains constant at zero. Thus, for a corresponding x-y graph, a straight line is traversed from point 1 to point 2. For the curvature-range graph from point 2 to point 3, the curvature steadily increases. Thus, the x-y graph between points 2 and 3 shows the curvature increasing as the distance is traveled. The curvature of a clothoid may be made directly proportional to the distanced traveled, e.g., the curvature may increase constantly along the covered distance.

For example, for every meter of distance traveled between point 2 and point 3 the curvature increases by 0.0001 (1/meter). For the driver of a vehicle, as the vehicle travels between point 2 and point 3, the driver rotates the steering wheel evenly with a constant speed. From point 3 to point 4, the curvature remains constant over the distance traveled. In this manner, sections of the clothoid are joined together to represent cartographic features on a map. When applying a clothoid, the curvature of a segment between points may be represented linearly. In addition, when applying other geometric shapes, the proportionality between the curvature and the range may be linear, logarithmic, exponential, etc.

Figure 5:
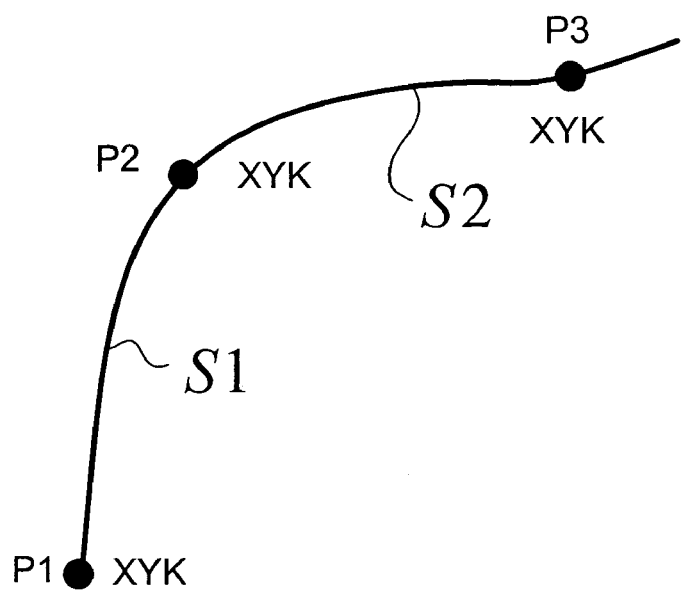
FIG. 5 is a pictorial illustrating a pair of clothoid sections joined together by points to represent a cartographic feature.
Figure 6:
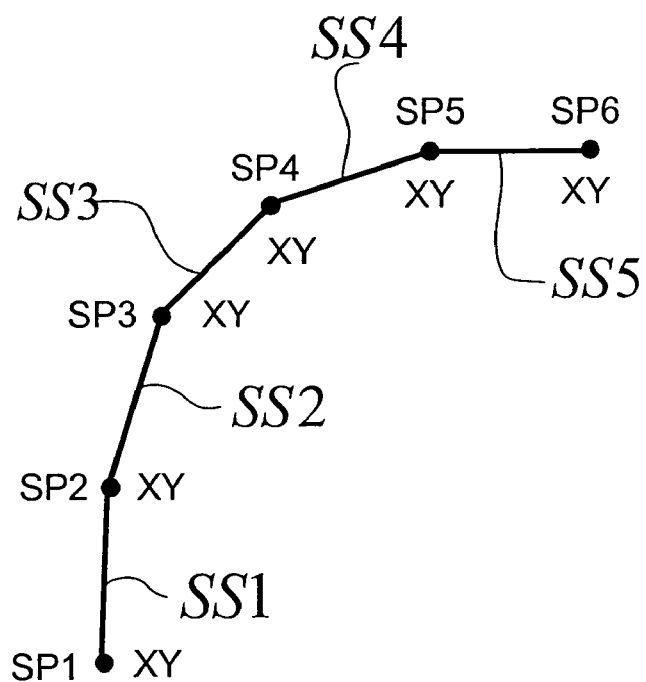
FIG. 6 is a pictorial illustrating the cartographic feature illustrated in FIG. 5, but represented by straight line segments.

FIG. 5 is a pictorial illustration of a clothoid data model in which a pair of clothoid sections S1 and S2 are joined together by points P1, P2 and P3 to form a cartographic feature. Each clothoid section is represented by a starting node or point located on an x-y axis of a Cartesian coordinate system, and includes a value for curvature K, and an end point on the x-y axis with a curvature K. FIG. 6 is a pictorial illustration of the same cartographic feature illustrated in the clothoid data model of FIG. 5, but represented by straight line segments in a straight line data model. Comparing FIGS. 5 and 6, the use of clothoids in FIG. 5 allows for the cartographic features to be more accurately displayed utilizing fewer data points than the methodology of using a series of straight line segments SS1–SS5 between points SP1–SP6 to represent the curve. The use of clothoids to represent the curves of a cartographic feature gives the user of the navigation system a more accurate representation of the road they are traveling.

Mathematical Equations Representing a Clothoid

A clothoid is a curve whose curvature is proportional to its arc length. The clothoid may be calculated by the following formula:

$$l = K\alpha^2 \qquad \text{EQ. 1}$$

where l represents the arc length, K the curvature, and α represents the constant of proportionality. In parameter form, the equations of a clothoid may be expressed as coordinates as follows:

$$X_K(t) = a\sqrt{\pi} \int_{\tau=0}^{t} \cos\left(\frac{\pi}{2}\tau^2\right) d\tau \qquad \text{EQ. 2}$$

$$Y_K(t) = a\sqrt{\pi} \int_{\tau=0}^{t} \sin\left(\frac{\pi}{2}\tau^2\right) d\tau \qquad \text{EQ. 3}$$

$$\text{with } t = \frac{1}{a\sqrt{\pi}} l \qquad \text{EQ. 4}$$

Since all clothoids are similar, there exists a unit clothoid with a parameter value α that is equal to one (i.e., α=1). To speed up calculations, the x-y coordinates of the unit clothoid may be stored in a table (e.g., a sine-cosine table) and the actual clothoids may be calculated from these values, where t is the index. A unit clothoid, where α=1, may be:

$$X_K(t) = \sqrt{\pi} \int_{\tau=0}^{t} \cos\left(\frac{\pi}{2}\tau^2\right) d\tau \qquad \text{EQ. 5}$$

$$Y_K(t) = \sqrt{\pi} \int_{\tau=0}^{t} \sin\left(\frac{\pi}{2}\tau^2\right) d\tau \qquad \text{EQ. 6}$$

Since these integrals may not easily be solved, to calculate x and y axis values, the sine and cosine trigonometric functions may be converted to a Taylor series, represented by:

$$\cos(z) = +\frac{1}{0!}z^0 - \frac{1}{2!}z^2 + \frac{1}{4!}z^4 - \frac{1}{6!}z^6 + \ldots - \ldots \qquad \text{EQ. 7}$$

$$\sin(z) = +\frac{1}{1!}z^1 - \frac{1}{3!}z^3 + \frac{1}{5!}z^5 - \frac{1}{7!}z^7 + \ldots - \ldots \qquad \text{EQ. 8}$$

and may be inserted into the equations:

$$X_K(t) = \sqrt{\pi} \qquad \text{EQ. 9}$$

$$\int_{\tau=0}^{t} \left(+\frac{1}{0!}\frac{\pi^0}{2^0}\tau^0 - \frac{1}{2!}\frac{\pi^2}{2^2}\tau^4 + \frac{1}{4!}\frac{\pi^4}{2^4}\tau^8 - \frac{1}{6!}\frac{\pi^6}{2^6}\tau^{12} + \ldots - \ldots\right) d\tau$$

$$Y_K(t) = \sqrt{\pi} \int_{\tau=0}^{t} \left(+\frac{1}{1!}\frac{\pi^1}{2^1}\tau^2 - \right. \qquad \text{EQ. 10}$$

$$\left. \frac{1}{3!}\frac{\pi^3}{2^3}\tau^6 + \frac{1}{5!}\frac{\pi^5}{2^5}\tau^{10} - \frac{1}{7!}\frac{\pi^7}{2^7}\tau^{14} + \ldots - \ldots\right) d\tau$$

The integrals may then be solved as:

$$X_K(t) = \sqrt{\pi}\left(+\frac{1}{0!}\frac{\pi^0}{2^0}\frac{1}{1}\tau^1 - \frac{1}{2!}\frac{\pi^2}{2^2}\frac{1}{5}\tau^5 + \right. \qquad \text{EQ. 11}$$

$$\left. \frac{1}{4!}\frac{\pi^4}{2^4}\frac{1}{9}\tau^9 - \frac{1}{6!}\frac{\pi^6}{2^6}\frac{1}{13}\tau^{13} + \ldots - \ldots\right)\Big|_{\tau=0}^{t}$$

$$Y_K(t) = \sqrt{\pi}\left(+\frac{1}{1!}\frac{\pi^1}{2^1}\frac{1}{3}\tau^3 - \frac{1}{3!}\frac{\pi^3}{2^3}\frac{1}{7}\tau^7 + \right. \qquad \text{EQ. 12}$$

$$\left. \frac{1}{5!}\frac{\pi^5}{2^5}\frac{1}{11}\tau^{11} - \frac{1}{7!}\frac{\pi^7}{2^7}\frac{1}{15}\tau^{15} + \ldots - \ldots\right)\Big|_{\tau=0}^{t}$$

and with boundaries of the tau=0 to t, the Taylor series may be calculated as:

$$X_K(t) = \sqrt{\pi} \qquad \text{EQ. 13}$$

$$\left(+\frac{1}{0!}\frac{\pi^0}{2^0}\frac{1}{1}t^1 - \frac{1}{2!}\frac{\pi^2}{2^2}\frac{1}{5}t^5 + \frac{1}{4!}\frac{\pi^4}{2^4}\frac{1}{9}t^9 - \frac{1}{6!}\frac{\pi^6}{2^6}\frac{1}{13}t^{13} + \ldots - \ldots\right)$$

$$Y_K(t) = \sqrt{\pi}\left(+\frac{1}{1!}\frac{\pi^1}{2^1}\frac{1}{3}t^3 - \frac{1}{3!}\frac{\pi^3}{2^3}\frac{1}{7}t^7 + \right. \qquad \text{EQ. 14}$$

$$\left. \frac{1}{5!}\frac{\pi^5}{2^5}\frac{1}{11}t^{11} - \frac{1}{7!}\frac{\pi^7}{2^7}\frac{1}{15}t^{15} + \ldots - \ldots\right)$$

As indicated, the series may be truncated after any number of terms, so that a polynomial remains. These terms of the polynomials may also be stored in a table. The number of terms may be implementation dependent. Thus, for example, the polynomial may conclude with the ninth term since, with a typically computer systems using 64 bit floating point numbers, the precision of the factorial of the last term in a nine term polynomial is equivalent to the precision of the mantissa (53 bits), where:

$$18! \approx 2^{53} \qquad \text{EQ. 15}$$

Those skilled in the art will appreciate that approaches other than a Taylor series may be used to solve the above integral, such as by using a Newton interpolation formula, or an interpolation formula from LaGrange or Aitken-Neville.

The angle phi ($\gamma$) representing the heading may be derived from the original x and y integrals.

$$\gamma(t) = \frac{\pi}{2}t^2 \qquad \text{EQ. 16}$$

Depending on the curvature K, x, y and phi may be used instead of the parameter t, where:

$$t = \frac{a}{\sqrt{\pi}} K \qquad \text{EQ. 17}$$

The formulas for x, y and phi become:

$$X_K(K) = +\frac{1}{0!}\frac{1}{2^0}\frac{1}{1}a^1 \cdot K^1 - \frac{1}{2!}\frac{1}{2^2}\frac{1}{5}a^5 \cdot K^5 + \qquad \text{EQ. 18}$$
$$\frac{1}{4!}\frac{1}{2^4}\frac{1}{9}a^9 \cdot K^9 - \frac{1}{6!}\frac{1}{2^6}\frac{1}{13}a^{13} \cdot K^{13} + ..$$

$$Y_K(K) = +\frac{1}{1!}\frac{1}{2^1}\frac{1}{3}a^3 \cdot K^3 - \frac{1}{3!}\frac{1}{2^3}\frac{1}{7}a^7 \cdot K^7 + \qquad \text{EQ. 19}$$
$$\frac{1}{5!}\frac{1}{2^5}\frac{1}{11}a^{11} \cdot K^{11} - \frac{1}{9!}\frac{1}{2^9}\frac{1}{15}a^{15} \cdot K^{15} +$$

$$\text{where } \gamma(K) = \frac{1}{2}a^2 K^2 \qquad \text{EQ. 20}$$

Using the Clothoid for Maps

There are several ways to describe a clothoid within a data model. First, the clothoid may start at curvature $K_0$, include a length l and have an ending curvature $K_1$. Thus, the constant of proportionality a may be calculated as:

$$a = \sqrt{\frac{l}{K_1 - K_0}} \qquad \text{EQ. 21}$$

In some instances, the sign of the curvature may be relevant to represent a heading, or direction, of the line. With a positive curvature the curve may travel to the left and with a negative curvature the curve may travel to the right. The constant of proportionality $\alpha$ and the heading d may be calculated as:

$$a = \sqrt{\frac{l}{|K_1 - K_0|}} \qquad \text{EQ. 22}$$

$$d = \text{sign}(K_1 - K_0) \qquad \text{EQ. 23}$$

In the case of a line or circle, in which the difference between the curvatures is zero, theoretically $\alpha$ is infinite, which may be handled separately. For example, if the absolute value of either the beginning or end of the curvature is below a minimum value, a line is used, and if above the minimum value, a circle is used.

Second, the clothoid may be represented by a starting point $X_0, Y_0$, a starting curvature $K_0$, an ending point $X_1, Y_1$ and an ending curvature $K_1$. The constant of proportionality $\alpha$ and a rotation beta may be calculated for a scaled, rotated and positioned unit clothoid, where:

$$X_1 - X_0 = \alpha \cdot \cos(\beta) \cdot (X_K(K_1) - X_K(K_0)) - \alpha \cdot \sin(\beta) \cdot (Y_K(K_1) - Y_K(K_0)) \qquad \text{Eq. 24}$$

$$Y_1 - Y_0 = \alpha \cdot \cos(\beta) \cdot (Y_K(K_1) - Y_K(K_0)) + \alpha \cdot \sin(\beta) \cdot (X_K(K_1) - X_K(K_0)) \qquad \text{EQ. 25}$$

Figure 7:
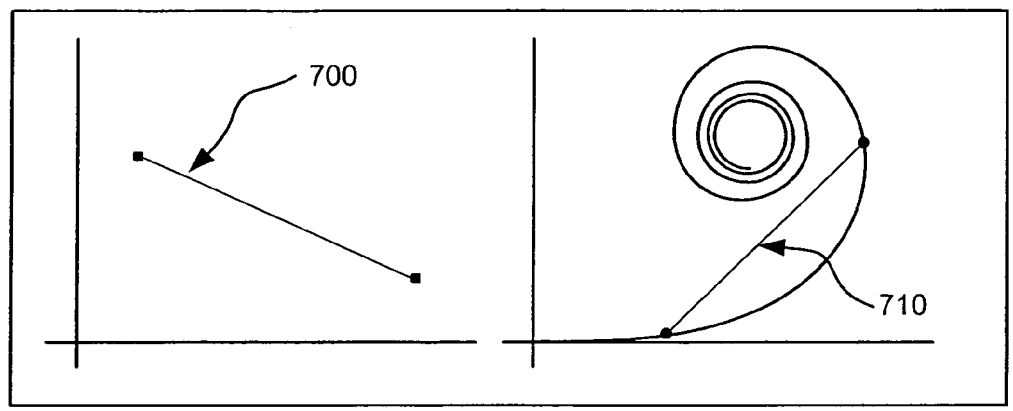
FIG. 7 are graphs illustrating the relationship of a vector to a secant of the clothoid to scale the clothoid.

FIG. 7 are graphs illustrating the relationship of a vector 700 (graph on the left) to a secant of the clothoid 710 (graph on the right) to scale the clothoid. Using equations 24 and 25, the terms on the left side of the equations may describe a vector 700 extending from the starting to the ending point. The terms on the right side of the equations may describe a secant part of the clothoid 710 from a starting point on the curve to an ending point on the curve. The secant 710 may be scaled and rotated. To help accommodate easily reading the formulas, the following terms are substituted:

$$\Delta X = X_1 - X_0 \qquad \text{EQ. 26}$$

$$\Delta X_k = X_K(K_1) - X_K(K_0) \qquad \text{EQ. 27}$$

$$\Delta Y = Y_1 - Y_0 \qquad \text{EQ. 28}$$

$$\Delta Y_k = Y_K(K_1) - Y_K(K_0) \qquad \text{EQ. 29}$$

Thus, the formulas may be re-written as:

$$\Delta X = \alpha \cdot \cos(\beta) \cdot \Delta X_K - \alpha \cdot \sin(\beta) \cdot \Delta Y_K \qquad \text{EQ. 30}$$

$$\Delta Y = \alpha \cdot \cos(\beta) \cdot \Delta Y_K + \alpha \cdot \sin(\beta) \cdot \Delta X_K \qquad \text{EQ. 31}$$

The constant of proportionality may be calculated as:

$$a \cdot \sin(\beta) = \frac{-\Delta X \cdot \Delta Y_K + \Delta Y \cdot \Delta X_K}{\Delta X_K^2 + \Delta Y_K^2} \qquad \text{EQ. 32}$$

$$a \cdot \cos(\beta) = \frac{+\Delta X \cdot \Delta X_K + \Delta Y \cdot \Delta Y_K}{\Delta X_K^2 + \Delta Y_K^2} \qquad \text{EQ. 33}$$

By using Pythagorean's Theorem:

$$\sin^2(z) + \cos^2(z) = 1 \qquad \text{EQ. 34}$$

The constant of proportionality $\alpha$ may be $$a^2 = (a \cdot \sin(\beta))^2 + (a \cdot \cos(\beta))^2 = \qquad \text{EQ. 35}$$

$$\frac{\Delta X^2 \cdot \Delta Y_K^2 - 2 \cdot \Delta X \cdot \Delta Y \cdot \Delta X_K \cdot \Delta Y_K + \Delta Y^2 \cdot \Delta X_K^2}{(\Delta X_K^2 + \Delta Y_K^2)^2} +$$

$$\frac{\Delta X^2 \Delta X_K^2 + 2 \cdot \Delta X \cdot \Delta Y \cdot \Delta X_K \cdot \Delta Y_K + \Delta Y^2 \cdot \Delta Y_K^2}{(\Delta X_K^2 + \Delta Y_K^2)^2} = \qquad \text{EQ. 36}$$

$$\frac{\Delta X^2 \cdot \Delta Y_K^2 + \Delta Y^2 \cdot \Delta X_K^2 + \Delta X^2 \Delta X_K^2 + \Delta Y^2 \cdot \Delta Y_K^2}{(\Delta X_K^2 + \Delta Y_K^2)^2} = \qquad \text{EQ. 37}$$

$$\frac{(\Delta X^2 + \Delta Y^2) \cdot (\Delta X_K^2 + \Delta Y_K^2)}{(\Delta X_K^2 + \Delta Y_K^2)^2} = \qquad \text{EQ. 38}$$

$$\frac{\Delta X^2 + \Delta Y^2}{\Delta X_K^2 + \Delta Y_K^2} \qquad \text{EQ. 39}$$

In other words, the scaling factor of the clothoid $\alpha^2$ may equal the length of the vector divided by the length of the secant, so that:

$$a^2 = \frac{\Delta X^2 + \Delta Y^2}{\Delta X_K^2 + \Delta Y_K^2} \qquad \text{EQ. 40}$$

Thus, equation 40 illustrates the relationship between the vector and the secant of the clothoid.

Thus, the substituted terms may be calculated as:

$$\Delta X_k = X_K(K_1) - X_K(K_0) =$$
$$\sum_{i=0}^{\infty} \left( \frac{1}{(2 \cdot i)!} \cdot \frac{1}{2^{2 \cdot i}} \cdot \frac{1}{4 \cdot i + 1} \cdot a^{4 \cdot i + 1} \cdot (K_1^{4 \cdot i + 1} - (K_0^{4 \cdot i + 1})) \cdot (-1)^i \right) \qquad \text{EQ. 41}$$

$$\Delta X_K^2 = \sum_{i=0}^{\infty} \sum_{j=0}^{\infty} \left( \frac{1}{(2 \cdot i)! \cdot (2 \cdot j)!} \cdot \frac{1}{2^{2 \cdot (i+j)}} \cdot \frac{1}{(4 \cdot i + 1) \cdot (4 \cdot j + 1)} \cdot \right.$$
$$\left. a^{4 \cdot (i+J)+2} \cdot (K_1^{4 \cdot i + 1} - K_0^{4 \cdot i + 1}) \cdot (K_1^{4 \cdot j + 1} - K_0^{4 \cdot j + 1})) \cdot (-1)^{i+j} \right)$$

$$\Delta Y_k = Y_K(K_1) - Y_K(K_0) = \qquad \text{EQ. 43}$$

$$\sum_{i=0}^{\infty} \left( \frac{1}{(2 \cdot i + 1)!} \cdot \frac{1}{2^{2 \cdot i + 1}} \cdot \frac{1}{4 \cdot i + 3} \cdot a^{4 \cdot i + 3} \cdot (K_1^{4 \cdot i + 3} - K_0^{4 \cdot i + 3}) \cdot (-1)^i \right) \qquad \text{EQ. 44}$$

$$\Delta Y_K^2 = \sum_{i=0}^{\infty} \sum_{j=0}^{\infty} \left( \frac{1}{(2 \cdot i + 1)! \cdot (2 \cdot j + 1)!} \cdot \frac{1}{2^{2(i+j)+2}} \cdot \frac{1}{(4 \cdot i + 3) \cdot (4 \cdot j + 3)} \cdot \right.$$
$$\left. a^{4 \cdot (i+J)+6} \cdot (K_1^{4 \cdot i + 3} - K_0^{4 \cdot i + 3}) \cdot (K_1^{4 \cdot j + 3} - K_0^{4 \cdot j + 3})) \cdot (-1)^{i+j} \right)$$

A zero crossing formula results as follows:

$$\alpha^2 \cdot (\Sigma\Sigma(\ldots) + \Sigma\Sigma(\ldots)) - (\Delta X^2 + \Delta Y^2) = 0 \qquad \text{EQ. 46}$$

To calculate the constant of proportionality α, the first zero crossing may be calculated. Newton's method may be used to calculate the first zero crossing since Newton's method has a fast convergence and merely a few iteration steps are necessary.

$$a_{n+1} = a_n - \frac{f(a_n)}{f'(a_n)} \qquad \text{EQ. 47}$$

A starting value for the Newton's method is the length of the vector, i.e., the distance between starting point and ending point of the vector.

$$a_0 = \sqrt{\Delta X^2 + \Delta Y^2} \qquad \text{EQ. 48}$$

There may be a limit of uniqueness, beyond which multiple zero crossings may occur. Accordingly, the usable part of a clothoid may be reduced to:

$$t = -\sqrt{2} \ldots +\sqrt{2} \qquad \text{EQ. 49}$$

(In words, t may occur from the negative square root of two to the positive square root of two)

$$K = -\frac{\sqrt{2} \cdot \sqrt{\pi}}{a} \ldots + \frac{\sqrt{2} \cdot \sqrt{\pi}}{a}. \qquad \text{EQ. 50}$$

Figure 8:
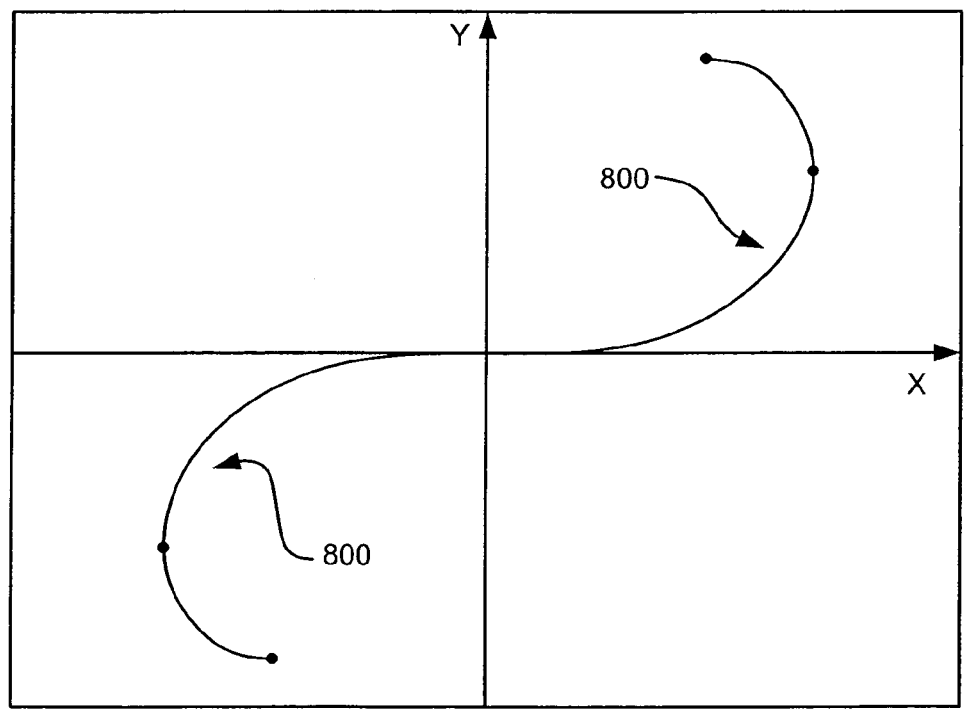
FIG. 8 is a graph illustrating the mathematically usable part of the clothoid.

Exceeding the limit mathematically may indicated that the first zero crossing has become complex. FIG. 8 is a graph illustrating the mathematically usable part of the clothoid 800. The result from Newton's method may be verified by this limit:

$$-\sqrt{2} \le \frac{a}{\sqrt{\pi}} K_0 \le \qquad \text{EQS. 51 and 52}$$
$$+\sqrt{2} \text{ and } -\sqrt{2} \le \frac{a}{\sqrt{\pi}} K_1 \le +\sqrt{2},$$

and may also be verified with the zero crossing formula:

$$\alpha^2 \cdot (\Delta X_K^2 + \Delta Y_K^2) = \Delta X^2 + \Delta Y^2 \qquad \text{EQ. 53}$$

If the result is beyond the limit, the result may also equate to a line or a circle.

After the constant of proportionality a has been calculated, the rotation value beta may be calculated as:

$$\beta = \tan^{-1}\left( \frac{-\Delta X \cdot \Delta Y_K + \Delta Y \cdot \Delta X_K}{+\Delta X \cdot \Delta X_K + \Delta Y \cdot \Delta Y_K} \right) \qquad \text{EQ. 54}$$

and the heading d may be calculated as:

$$d = \text{sign}(K_1 - K_0) \qquad \text{EQ. 55}$$

Calculation of a Clothoid Path

Figure 9:
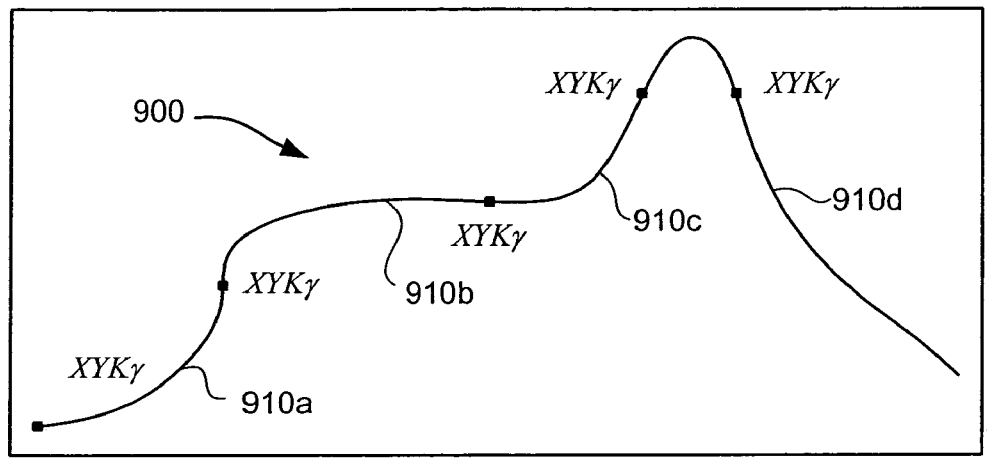
FIG. 9 is a graph illustrating a clothoid path.

FIG. 9 is a graph illustrating a clothoid path 900 (also known as clothoid spline) representing a cartographic feature, such as, a street. The clothoid path 900 may be constructed from a string of connected clothoid lines 910a–d. The connection points (XYKγ) of the clothoid sections 910a–d may cause additional constraints. At the connection points (XYKγ), the curvature K and heading phi of the connecting clothoid sections may be the same to ensure continuity of the clothoid path (otherwise, in essence, a cartographic feature, such as a street, would include a kink).

The heading of the connecting clothoid section may be aligned using multiple iteration steps. Based on the heading of the connecting clothoid sections, a heading difference may be calculated along with a change of the curvature. If the heading difference is positive, the curvature may be increased. If the heading difference is negative, the curvature may be decreased. Such that:

$$K_{n+1} = K_n + \frac{\Delta \gamma}{\frac{1}{2}(l_0 + l_1)} \cdot c \qquad \text{EQ. 56}$$

with $$c \approx \frac{1}{3} \qquad \text{EQ. 57}$$

The change in heading may be scaled by the lengths $l_0$ and $l_1$ of the connecting clothoid sections and a constant c, which are used to optimize each iteration step enhancement. If the constant c is chosen to be too small, the calculation may take a long time to compute, and if the constant c is too large, the connection may oscillate.

Calculating the Distance Between a Clothoid and a Point

An algorithm may be used on various applications for calculating the distance between a clothoid and a point. The algorithm may be executed by a computer. For example, the algorithm could be used in calculating clothoid regressions, e.g., to convert a line data model to a clothoid data model. The algorithm could also be used during navigation, e.g., to match a GPS determined position to a position on a street. If the clothoid is not the unit clothoid, the point may be transformed into the unit clothoid space using the reverse of the transformation described in EQ. 24 and 25.

To calculate the distance between the unit clothoid and the transformed point, the nadir (i.e., the point on the clothoid that is nearest to the transformed point) may be calculated using an iterative process. The distance d between the unit clothoid and the transformed point may be calculated as:

$$d^2 = \left(X - X_K\left(\frac{a}{\sqrt{\pi}}K\right)\right)^2 + \left(Y - Y_K\left(\frac{a}{\sqrt{\pi}}K\right)\right)^2 \qquad \text{EQ. 58}$$

with $$t = \frac{a}{\sqrt{\pi}}K \qquad \text{EQ. 59}$$

where the distance d is a function of the distances between points on the unit clothoid and the transformed point. A global minimum of the distance function is located by first separating the unit clothoid into several regions.

Figure 10:
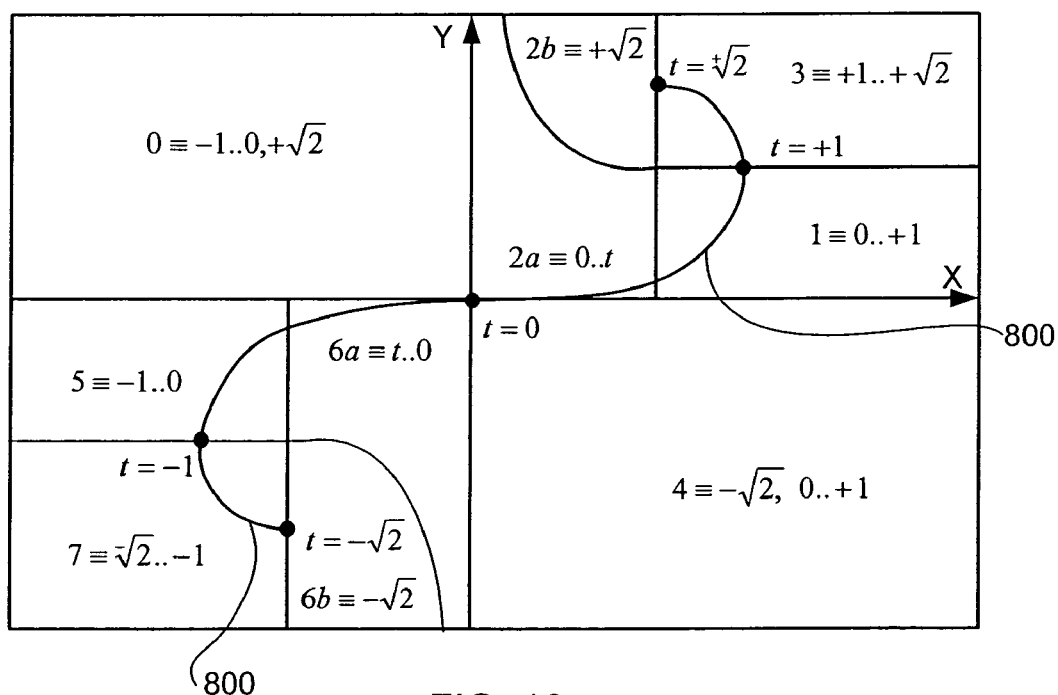
FIG. 10 is a graph illustrating the separation of a graph of the clothoid into regions.

FIG. 10 is a graph illustrating a way to separate the graph of the usable part of the clothoid 800 into regions (labeled 0, 1, 2a, 2b, 3, 4, 5, 6a, 6b and 7) to aid in the determination of d. Within each region, the distance function may be a unimodal. Thus, the distance function may include one local minimum within the region. This local minimum may be determined using a Golden Section method. For example, with regard to region 4 the distance function may be calculated from t=0 to t=1 and t=sqrt(−2).

Except for regions 2 and 6, all the regions may be separated by straight lines. Region 2 and 6 may be separated by a curve into regions 2a, 2b, 6a and 6b. The curve may be an envelope of all perpendiculars (i.e., the curve which encloses the upright lines on the clothoid).

The perpendiculars may be calculated as:

$$X = X_K(t) - u \cdot \sin\left(\frac{\pi}{2} \cdot t^2\right) \qquad \text{EQ. 60}$$

$$Y = Y_K(t) - u \cdot \cos\left(\frac{\pi}{2} \cdot t^2\right) \qquad \text{EQ. 61}$$

By eliminating the parameter u:

$$\frac{X - X_K(t)}{\sin\left(\frac{\pi}{2} \cdot t^2\right)} = \frac{Y - Y_K(t)}{\cos\left(\frac{\pi}{2} \cdot t^2\right)} \qquad \text{EQ. 62}$$

where $$X \cdot \cos\left(\frac{\pi}{2} \cdot t^2\right) - X_K(t) \cdot \cos\left(\frac{\pi}{2} \cdot t^2\right) + \qquad \text{EQ. 63}$$
$$Y \cdot \sin\left(\frac{\pi}{2} \cdot t^2\right) - Y_K(t) \cdot \sin\left(\frac{\pi}{2} \cdot t^2\right) = 0.$$

Calculating the derivation:

$$-X \cdot \pi \cdot t \cdot \sin\left(\frac{\pi}{2} \cdot t^2\right) - \sqrt{\pi} \cdot \cos\left(\frac{\pi}{2} \cdot t^2\right) \cdot \cos\left(\frac{\pi}{2} \cdot t^2\right) + \qquad \text{EQ. 64}$$
$$X_K(t) \cdot \pi \cdot t \cdot \sin\left(\frac{\pi}{2} \cdot t^2\right) + Y \cdot \pi \cdot t \cdot \cos\left(\frac{\pi}{2} \cdot t^2\right) -$$
$$\sqrt{\pi} \cdot \sin\left(\frac{\pi}{2} \cdot t^2\right) \cdot \sin\left(\frac{\pi}{2} \cdot t^2\right) - Y_K(t) \cdot \pi \cdot t \cdot \cos\left(\frac{\pi}{2} \cdot t^2\right) = 0$$

The equation may be simplified using Pythagorean's Theorem:

$$-X \cdot \pi \cdot t \cdot \sin\left(\frac{\pi}{2} \cdot t^2\right) + X_K(t) \cdot \pi \cdot t \cdot \sin\left(\frac{\pi}{2} \cdot t^2\right) + \qquad \text{EQ. 65}$$
$$Y \cdot \pi \cdot t \cdot \cos\left(\frac{\pi}{2} \cdot t^2\right) - Y_K(t) \cdot \pi \cdot t \cdot \sin\left(\frac{\pi}{2} \cdot t^2\right) = \sqrt{\pi}$$

Combining the primitive and the derived functions:

$$X = \frac{+X_K(t) \cdot \pi \cdot t \cdot \cos\left(\frac{\pi}{2} \cdot t^2\right) \cdot \cos\left(\frac{\pi}{2} \cdot t^2\right) +}{\pi \cdot t \cdot \sin\left(\frac{\pi}{2} \cdot t^2\right) \cdot \sin\left(\frac{\pi}{2} \cdot t^2\right) + \pi \cdot t \cdot \cos\left(\frac{\pi}{2} \cdot t^2\right) \cdot \cos\left(\frac{\pi}{2} \cdot t^2\right)} + \qquad \text{EQ. 66}$$

-continued $$+X_K(t)\cdot\pi\cdot t\cdot\sin\left(\frac{\pi}{2}\cdot t^2\right)\cdot\sin\left(\frac{\pi}{2}\cdot t^2\right)-$$

$$\frac{Y_K(t)\cdot\pi\cdot t\cdot\cos\left(\frac{\pi}{2}\cdot t^2\right)\cdot\sin\left(\frac{\pi}{2}\cdot t^2\right)-\sqrt{\pi}\cdot\sin\left(\frac{\pi}{2}\cdot t^2\right)}{\pi\cdot t\cdot\sin\left(\frac{\pi}{2}\cdot t^2\right)\cdot\sin\left(\frac{\pi}{2}\cdot t^2\right)+\pi\cdot t\cdot\cos\left(\frac{\pi}{2}\cdot t^2\right)\cdot\cos\left(\frac{\pi}{2}\cdot t^2\right)}$$

and again simplifying with Pythagorean's Theorem:

$$X = X_K(t) - \frac{\sqrt{\pi}\cdot\sin\left(\frac{\pi}{2}\cdot t^2\right)}{\pi\cdot t} \qquad \text{EQ. 67}$$

By comparing with the original formula for the perpendiculars:

$$u = \frac{1}{\sqrt{\pi}\cdot t}. \qquad \text{EQ. 68}$$

The formula for the envelop of the perpendiculars may be:

$$X = X_K(t) - \frac{1}{\sqrt{\pi}\cdot t}\cdot\sin\left(\frac{\pi}{2}\cdot t^2\right) \qquad \text{EQ. 69}$$

$$Y = Y_K(t) - \frac{1}{\sqrt{\pi}\cdot t}\cdot\cos\left(\frac{\pi}{2}\cdot t^2\right) \qquad \text{EQ. 70}$$

(using y instead of x leads to the same result) Here, the parameter t may not be eliminated. To determine which side of the curve the point is located, the parameter t may be calculated for X and then for Y. The Golden Section method may also be used since the function is unimodal. In addition, the X and Y values may be stored in a table.

According to the Golden Section method, first the determined boundaries may be used as starting values. The boundaries may be determined in accordance with the region of the clothoid 800, as shown in FIG. 10.

$$t_0 = t_0(\text{region}) \qquad \text{EQ. 71}$$

$$t_1 = t_1(\text{region}) \qquad \text{EQ. 72}$$

Results within the interval may be calculated using the values for the boundaries:

$$t_2 = t_0 + (1-\lambda)\cdot(t_1 - t_0) \qquad \text{EQ. 73}$$

$$t_3 = t_0 + \lambda\cdot(t_1 - t_0) \qquad \text{EQ. 74}$$

with $$\lambda = \frac{1}{2}\cdot\left(\sqrt{5}-1\right) \approx 0.61803 \qquad \text{EQ. 75}$$

as the Golden Section.

Both the distance between point $t_2$ on the clothoid and the transformed point as well as the distance between point $t_3$ on the clothoid and the transformed point may be calculated. Depending on which distance is bigger, the boundaries may be adjusted as follows:

If $d^2(t_2) > d^2(t_3)$ then $t_0' = t_0$, $t_1' = t_3$, $t_3' = t_2$     EQ. 76 and recalculate using EQ. 73.

If $d^2(t_2) \leq d^2(t_3)$ then $t_0' = t_2$, $t_1' = t_1$, $t_2' = t_3$     EQ. 77 and recalculate using EQ. 74.

Accordingly, using the Golden Section methodology, each following iteration involves recalculating the values $t_2$ or $t_3$, and the distances. The iterations may end when the difference between $t_0$ and $t_1$ is less than a determined value. For example, when the difference equals 1 cm for a 10 km clothoid. When to complete the iterations is implementation dependent, and the iterations may be completed after performing a fixed amount of interations. The clothoid section is identified by the boundary values $t_0$ ($t_1$) and the distance d is the error. Clothoid sections may be combined to form a clothoid path.

Data Model

Referring again to FIGS. 5 and 6, one difference between a data model that uses straight lines (FIG. 6) and a data model that uses clothoid sections (FIG. 5) is the description of the connection of clothoid sections via points. In the straight line data model, all lines are considered separately, while in the clothoid data model, multiple clothoid sections may be connected to form a clothoid path. The clothoid path may allow cartographic features, such as a street, to be represented as a continuous model. Parameters, such as position, curvature and heading, may be calculated at every point on the street.

Clothoids include a starting point XY, starting curvature K, an ending point X'Y', and an ending curvature K'. Thus, a clothoid path may include multiple points with curvature K. The points in the clothoid data model are advantageously robust in comparison to a straight line data model since the clothoid data model points may include multiple forms of information. In addition, a smaller number of points may be needed in the clothoid model than in the straight line data model to accurately describe a cartographic feature.

Figure 11:
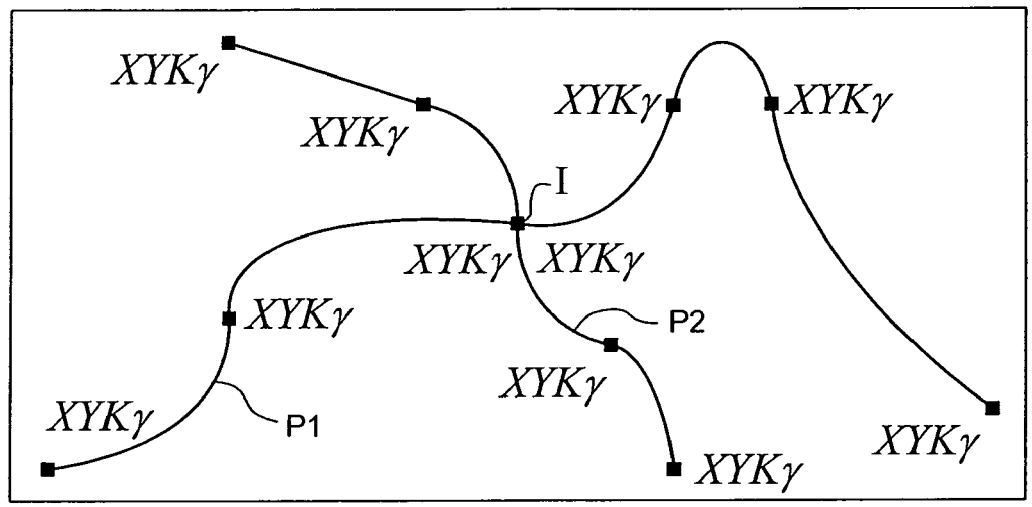
FIG. 11 is a pictorial illustrating two paths intersecting.

FIG. 11 is a pictorial illustrating path P1 intersecting with path P2. Paths P1 and P2 may be cartographic features, such as, the intersection of two streets. When multiple clothoid paths cross each other an intersection I is formed. Regarding a description of the point at intersection I, the position XY of the paths P1 and P2 may be equal. The curvature of paths P1 and P2, however, remain individual. Thus, at intersection I, a determination of which clothoid parts correspond to the path P1 and which clothoid parts correspond to the path P2 may be performed. Clothoid parts that correspond to both paths P1 and P2 may form a main path across the intersection. Although a single intersection I is illustrated in FIG. 11, it should be understood that multiple intersections I may be present.

Figure 12:
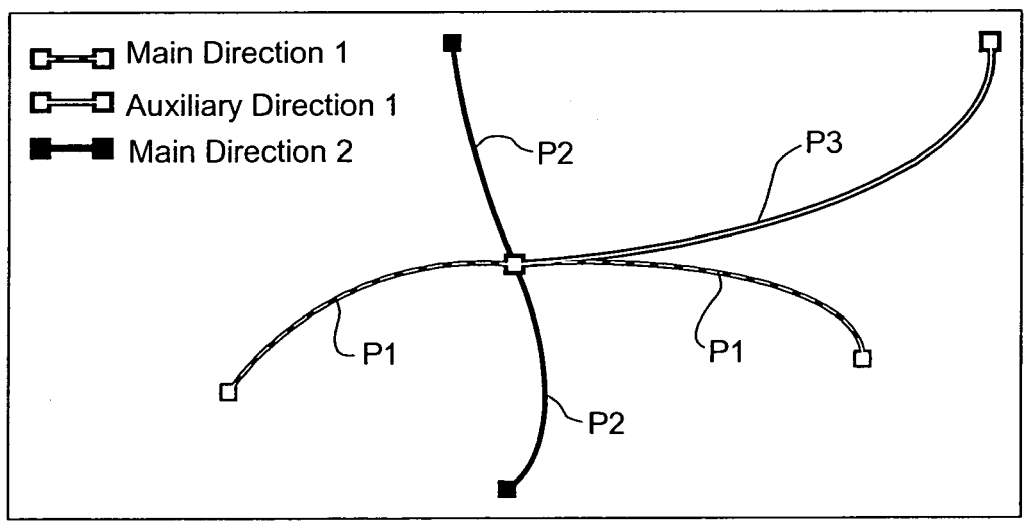
FIG. 12 is a pictorial illustrating two main paths intersecting and an auxiliary path.

FIG. 12 is another pictorial illustrating a first main path P1 intersecting a second main path P2 and further including an auxiliary path P3. For example, when a ramp is present on a street where one street joins another street, the ramp may form an auxiliary path P3. The auxiliary path P3 may include the same curvature as the main path P1 that it joins. Parameters for position X and Y may be used to describe the position of the intersection. Curvature value $K_0$ may be used to describe the curvature of main path P1 and auxiliary path P3, and curvature value $K_1$ may be used to describe the curvature of main path P2.

Conversion of XY Data to XYK Data

Figure 13:
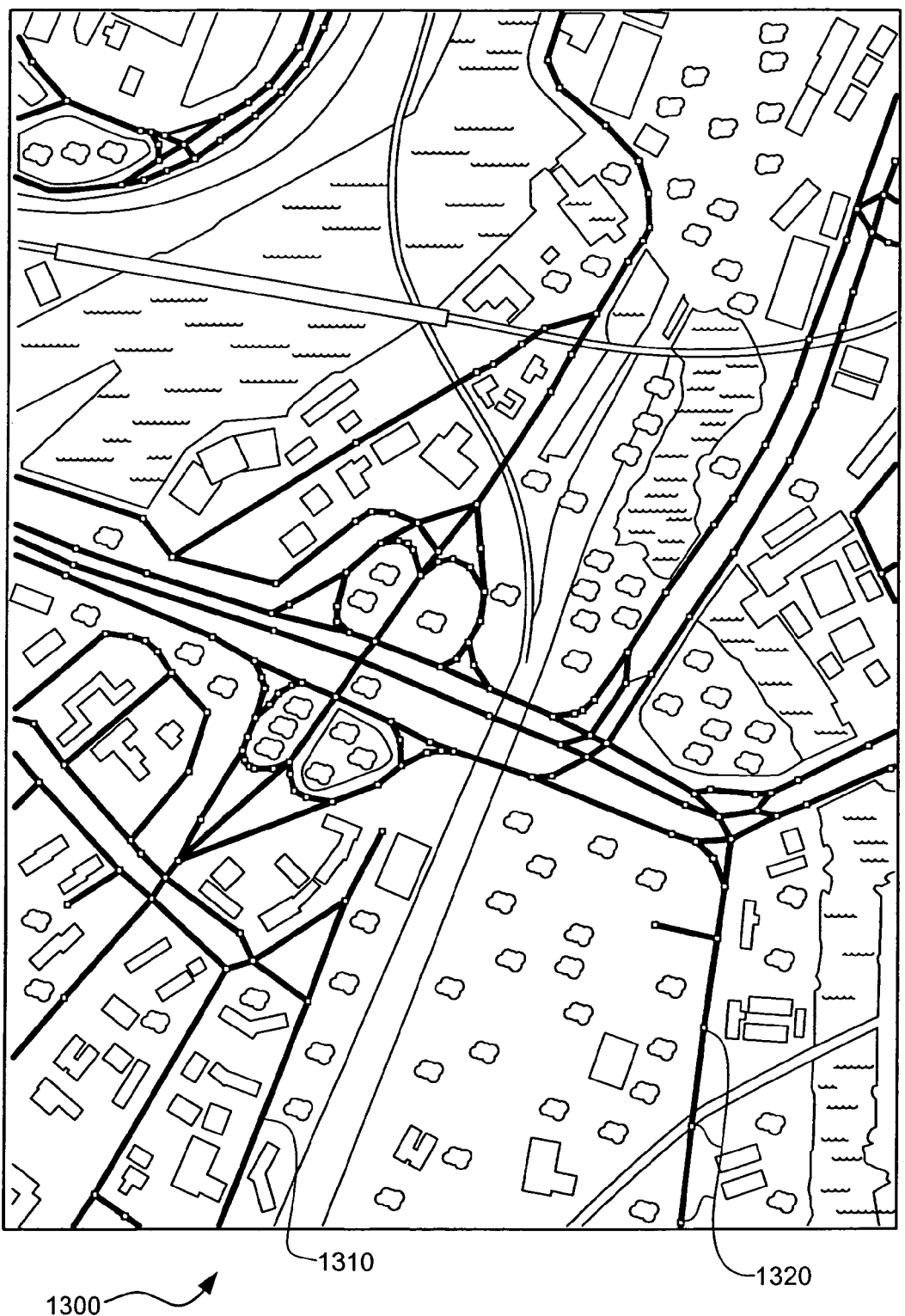
FIG. 13 is a pictorial illustrating a map where the streets are represented by points connected by straight lines.
Figure 14:
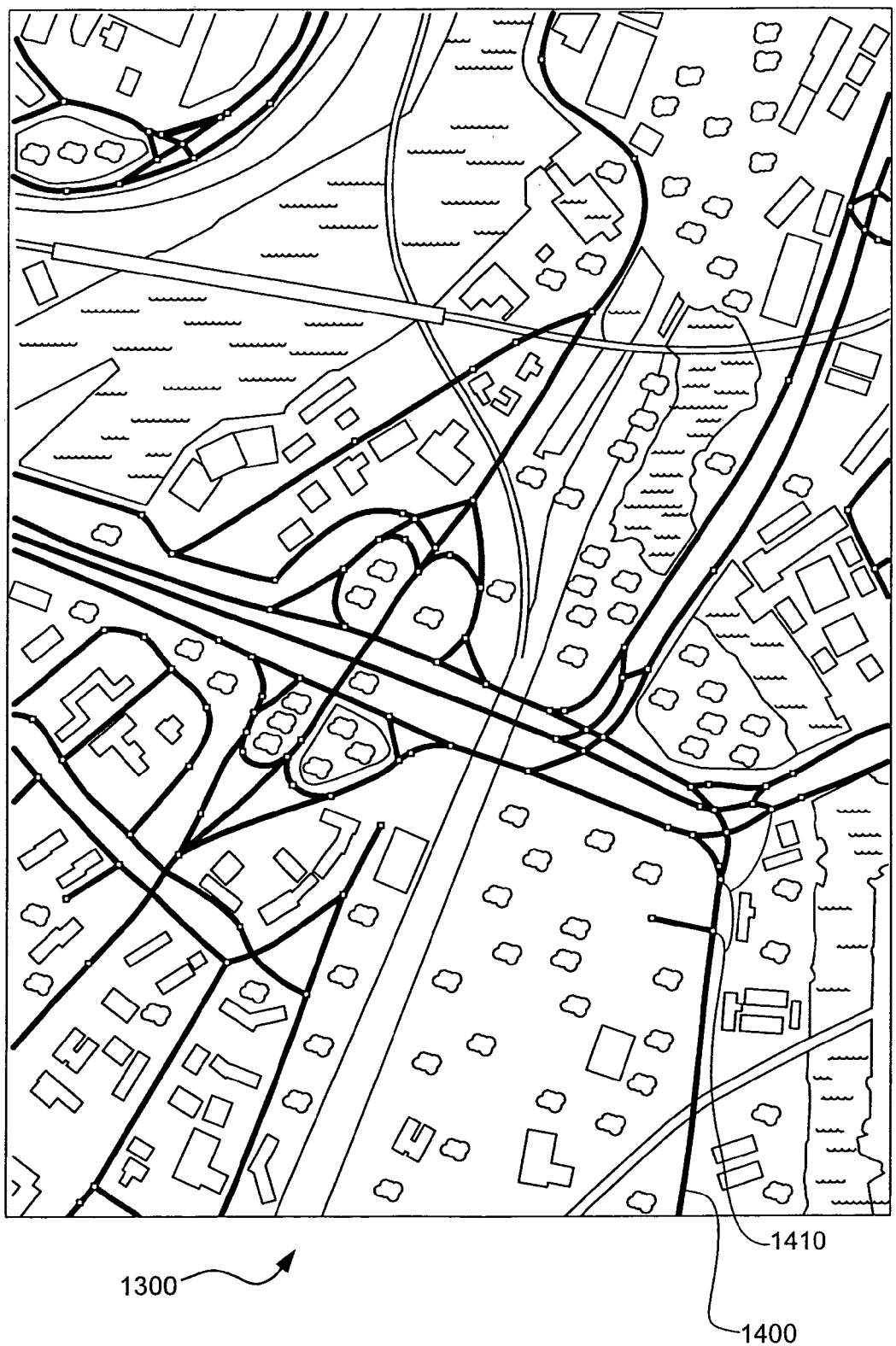
FIG. 14 is a pictorial illustrating the map of FIG. 13 where the streets are represented by fewer points than the map in FIG. 13 and the points are connected by lines that include a determined curvature.

FIG. 13 is another pictorial illustrating a map 1300 where the streets 1310 are represented by points 1320 connected by straight lines. The map 1300 may be improved by converting the straight line data model used in the map 1300 to a clothoid or other geometric data model. FIG. 14 is a pictorial illustrating the map 1300 of FIG. 13 with a clothoid data model. The streets 1400 are represented by fewer points 1410 than in the map depicted in FIG. 13, and the points are connected by clothoids, that include a determined curvature. Conversion from the straight line data model to the clothoid data model may be achieved by replacing straight lines with clothoid section(s) using previously discussed techniques as described by FIG. 15. In addition to replacing straight lines, the points 1410 depicted in FIG. 14 may be different, and therefore may or may not correspond, to the points 1310 depicted in FIG. 13.

Figure 15:
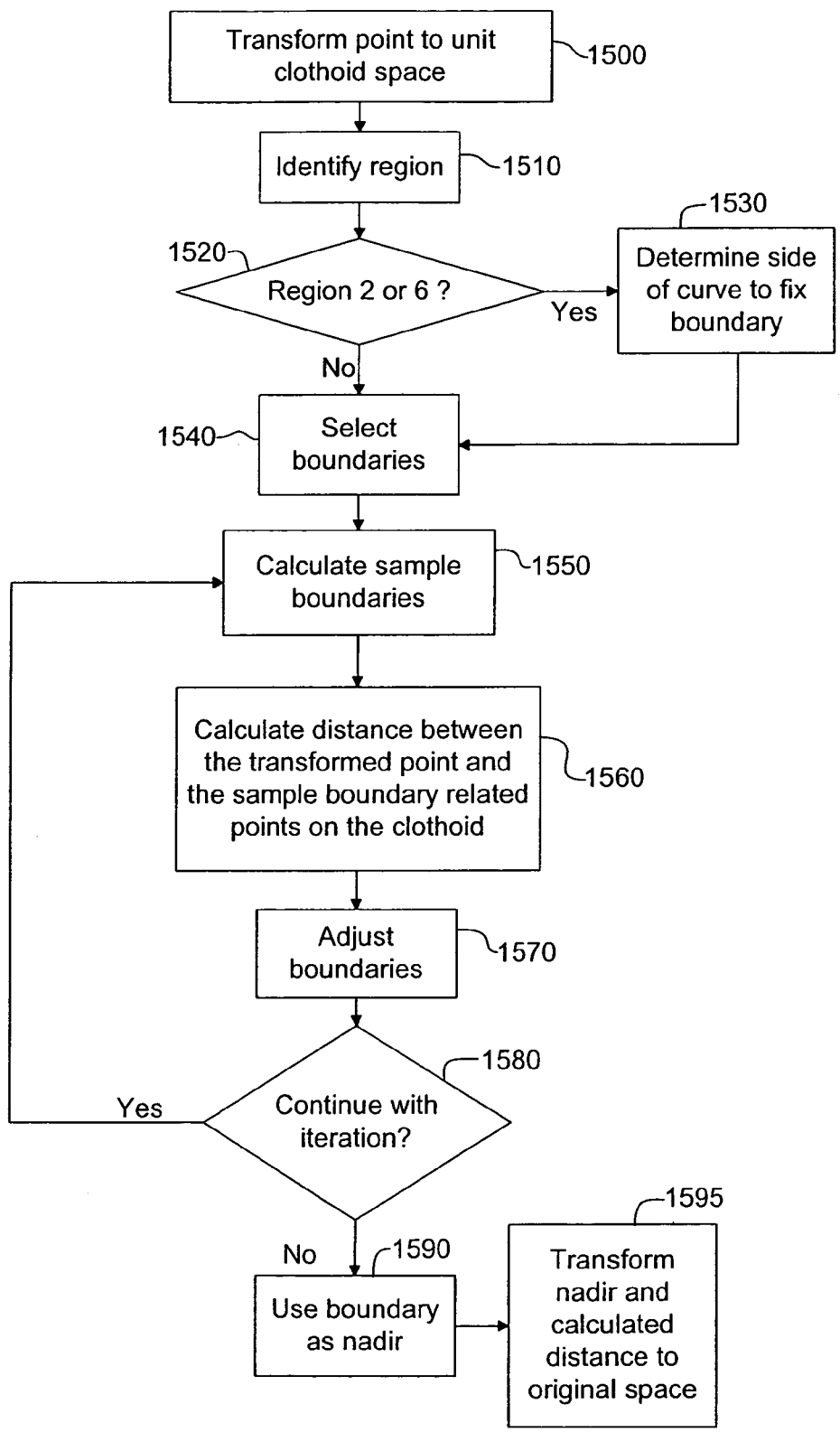
FIG. 15 is a flow chart representing the determination of a nadir and distance from a clothoid to a point.

FIG. 15 is a flow chart representing an iteration process for the determination of a nadir and distance from a clothoid to a point, for example, to convert XY data points to data point with XYK values. First, the XYK data points may be determined for the intersections of main and auxiliary paths. Multiple paths may connect to form an intersection. The paths may be related to each other over the intersection in three possible ways, a main direction, an auxiliary direction, or no relation. For example, the paths may be related as a "T" intersection. The two paths that form the horizontal of the "T" may be considered the main direction, and the remaining path forms no relation. Further, a path may form an auxiliary direction, such as an off-ramp of a highway. The ramp joins the main path, so the-direction of the auxiliary path is related to the main direction.

Figure 16:
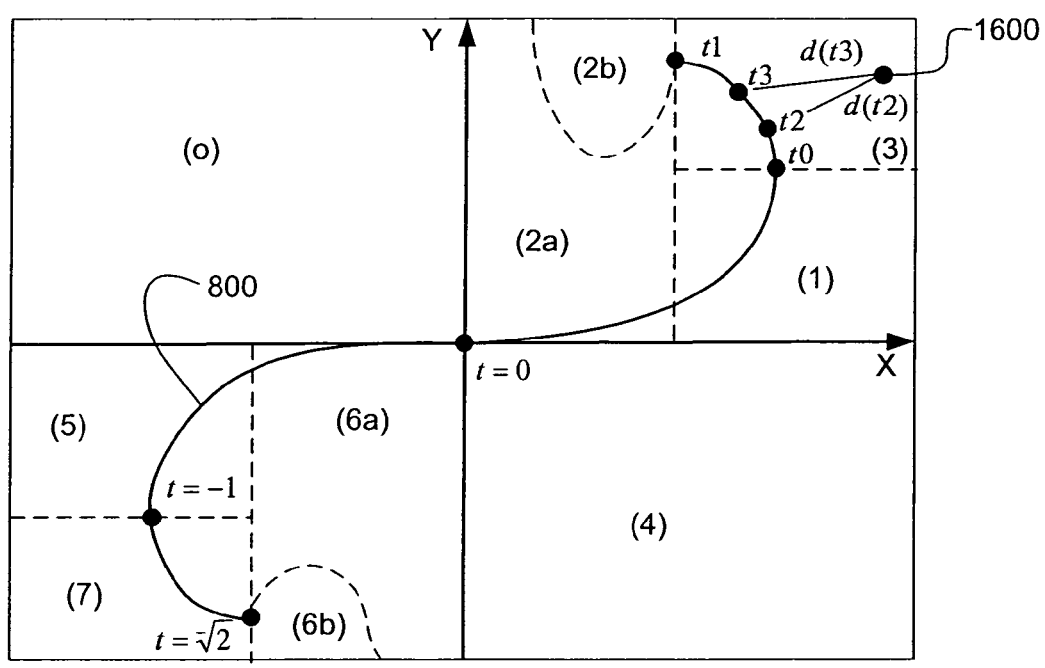
FIG. 16 is a graph illustrating the determination of a distance to a point using the separation of a graph of the clothoid into regions.

At block 1500, to simplify calculations, a point to be mapped is transformed into the unit clothoid space. FIG. 16 is a graph showing transformed point 1600 located in the unit clothoid space. At block 1510, the region in which the transformed point is located is determined (e.g., region 3 in FIG. 16). At block 1520, it is determined whether the region in which the transformed point 1600 is located is region 2 or 6. At block 1530, if the region is determined to be region 2 or 6, one of the boundaries t is unknown. Thus, a side of the curve is determined to fix the unknown boundary, for example, using the equations that calculate the envelope of the perpendiculars. At block 1540, the starting boundaries $t_0$ and $t_1$ are selected.

At block 1550, sample boundaries $t_2$ and $t_3$ are calculated. At block 1560, the distances between $x(t_2)$, $y(t_2)$ and the transformed point $(=d(t_2))$ and $x(t_3)$, $y(t_3)$ and the transformed point $(=d(t_3))$ are calculated (FIG. 16). At block 1570, the boundaries are adjusted, such as described in EQ. 76 and EQ. 77. At block 1580, it is determined whether to continue with the iterations, e.g., the calculated distance between $t_1$ and $t_2$ is within an acceptable error value or the determined number of iterations has been completed. At block 1550, if the iterations are not complete, the adjusted sample boundaries are calculated. At block 1590, if the iterations are complete, the sample boundaries $t_2$ or $t_3$ are used as the nadir. At block 1595, the nadir and the calculated distance are transformed to original space.

This process may be repeated to calculate the distance between other points and other clothoids. Data points XY may be converted to XYK data points for points on the lines connected between the intersections.

A Gauss error reduction methodology, e.g., Gauss error distribution curve, may be used to find the best fitting clothoids. The main and auxiliary directions may be calculated by converting possible combinations of directions to clothoids and utilizing the clothoid sections that best fit the intersection. Additional attributes taken into account, such as a street type, for example, to ensure that a ramp joins an interstate and not vice versa. The result includes data that specifies which paths may be main directions and which paths may be auxiliary directions where the curvature and heading at the intersection are known. The calculated curvature and heading data at the intersections remains constant while the geometry between the intersections may then be converted, for example, to clothoid paths.

While various embodiments of the invention have been described, it will be apparent to those of ordinary skill in the art that may more embodiments and implementations are possible that are within the scope of the invention.

What is claimed is:

1. A method of converting cartographic features represented in an electronic map, comprising:
    converting at least part of a cartographic feature to at least one clothoid section, where converting comprises converting a straight line data model to a clothoid data model; and
    determining a distance between at least one point in the straight line data model and a nearest point in the clothoid data model, and where determining the distance comprises:
    transforming the at least one point located in an original space to a transformed point located in a unit clothoid space;
    determining the distance between the at least one point and a unit clothoid;
    determining a region in the unit clothoid space in which the transformed point is located;
    selecting boundaries on the unit clothoid in accordance with the determined region; and
    iteratively adjusting the boundaries to identify a determined distance.

2. The method of claim 1 further comprising:
    calculating sample boundaries in accordance with the selected boundaries;
    calculating a distance between the sample boundaries and the transformed point;
    adjusting the sample boundaries;
    determining whether to continue calculating the distance; and
    if the calculations are complete, the calculated distance between the sample boundaries and the transformed point comprises the determined distance, otherwise, calculating new sample boundaries and calculating the distance between the new sample boundaries and the transformed point.

3. The method of claim 1 where the iterations is complete when a determined amount of iterations have been completed.

4. The method of claim 1 where the iterations is complete when a distance between the sample boundaries and the point is within a determined acceptable error value.

5. The method of claim 1 where determining the distance further comprises:
    transforming the determined distance to a distance in the original space.

6. The method of claim 1 where determining the distance further comprises:
    transforming the determined distance to distance in the original space.

7. A method for calculating the distance between a clothoid and a point, comprising:

transforming at least one point of a cartographic feature located in an original space to a transformed point located in a unit clothoid space;

selecting boundaries of a region of the unit clothoid in which the transformed point is located; and adjusting the boundaries as a function of a distance between the boundaries and the transformed point to identify a clothoid section representative of the at least one point of the cartographic feature.

8. The method of claim 7 where the calculations are complete when a determined amount of iterations have been completed.

9. The method of claim 7 where the calculations are complete when a distance between the sample boundaries and the point is within a determined acceptable error value.

10. The method of claim 7 further comprising transforming the distance to a transformed distance in the original space.

11. The method of claim 7 where the distance comprises a nadir.

12. The method of claim 7 further comprising verifying, with the calculated distance, that the clothoid section accurately represents at least a part of the cartographic feature.

13. The method of claim 12 where a navigation application utilizes the calculated distance to determine a distance between a cartographic feature and a specified location.

14. The method of claim 13 further comprising providing a processor to execute the navigation application.

15. The method of claim 13 where the specified location comprises a location of the processor.

16. The method of claim 15 where the processor is located in a vehicle.

17. A data processing system capable of determining the nearest distance between a point and a clothoid comprising:

a processor to (i) transform a point located in an original space to a transformed point located in a unit clothoid space; (ii) determine a region in the unit clothoid space where the transformed point is located; (iii) select boundaries on the unit clothoid in accordance with the determined region; (iv) calculate sample boundaries in accordance with the selected boundaries; (v) calculate a distance between the sample boundaries and the point; (vi) adjust the sample boundaries; (vii) determine whether a series of iterations is complete; and (viii) if the series of iterations is complete, the calculated distance between the sample boundaries and the point comprises the determined distance, otherwise, calculating new sample boundaries and returning to (v).

18. The data processing system of claim 17 where the series of iterations is complete when a determined amount of iterations have been completed.

19. The data processing system of claim 17 where the series of iterations is complete when a distance between the sample boundaries and the point is within a determined acceptable error value.

20. The data processing system of claim 17 where the processor transforms the calculated distance to a transformed distance in the original space.

21. The data processing system of claim 17 further comprising a navigation application.

22. The data processing system of claim 21 where the navigation application utilizes the calculated distance to determine a distance between a cartographic feature and a specified point.

23. The data processing system of claim 22 where the processor executes the navigation application.

24. The data processing system of claim 23 where the specified point comprises a current geographic location of the processor.

25. The data processing system of claim 24 where the processor is located with a vehicle.

* * * * *